United States Patent [19]
Specht

[11] 3,946,756
[45] Mar. 30, 1976

[54] PRESSURE CONTROL VALVE

[75] Inventor: Glenn E. Specht, Charlestown, W. Va.

[73] Assignee: A-T-O Inc., Willoughby, Ohio

[22] Filed: May 30, 1974

[21] Appl. No.: 474,651

[52] U.S. Cl. ............ 137/495; 137/505.28; 251/285
[51] Int. Cl.² .......................................... F16K 31/14
[58] Field of Search .......... 137/495, 505.27, 505.36, 137/505.22, 508, 593, 505.28, 505.29, 557; 251/285, 284

[56] References Cited
UNITED STATES PATENTS

| 219,178 | 9/1879 | Schmidt | 137/505.27 |
|---|---|---|---|
| 449,222 | 3/1891 | Kimball et al. | 137/505.28 X |
| 685,396 | 10/1901 | Dexter | 251/285 X |
| 1,446,710 | 2/1923 | Loescher et al. | 251/285 |
| 1,815,349 | 7/1931 | Doughty et al. | 251/285 X |
| 1,984,792 | 12/1934 | Ford | 137/495 |
| 3,692,047 | 9/1972 | Camp | 137/495 |

FOREIGN PATENTS OR APPLICATIONS

| 117,593 | 4/1927 | Switzerland | 137/557 |
|---|---|---|---|
| 389,110 | 9/1908 | France | 137/557 |
| 505,717 | 5/1939 | United Kingdom | 137/505.28 |

*Primary Examiner*—Martin P. Schwadron
*Assistant Examiner*—Robert J. Miller
*Attorney, Agent, or Firm*—Webster B. Harpman

[57] ABSTRACT

A pressure control valve for use in conjunction with a riser for supplying water, in case of a fire, at all levels of a multiple story structure at a predetermined regulated static and flowing discharge pressure. The valve includes a hand wheel on a stem engaging the valve, a normally inaccessible static pressure control collar on said stem and a diaphragm sensitive to flowing discharge pressure at the discharge side of the valve tending to close the valve and a spring opposing the diaphragm, said hand wheel arranged to move said valve stem relative to said diaphragm and close the valve without altering the pressure adjustment thereof.

3 Claims, 3 Drawing Figures

PRESSURE CONTROL VALVE

BACKGROUND OF THE INVENTION

1. Field of the Invention

This invention relates to pressure control valves of the type employed on the various floors of a multiple story structure in communication with vertical water supply pipes therein so that a high ground level pressure in the vertical water supply pipes may be reduced to a suitable working pressure at ground level and at various floors thereabove.

2. Description of the Prior Art

Prior structures of this type usually employ diaphragm operated valves sensitive to pressure at the discharge side and have been capable of controlling static pressure at various floor levels in a multiple story structure. See for example U.S. Pat. Nos. 1,302,538, 1,897,517, 1,984,792, 3,189,041, 3,273,589, 3,400,734, 2,026,704 and 3,692,047.

This invention provides a pressure control valve that is capable of being adjusted to a preset static pressure and to a similar flowing discharge pressure and which will automatically maintain the desired preset flowing pressure equal to the static pressure at which it was preset.

SUMMARY OF THE INVENTION

A pressure control valve has a movable valve element positioned between inlet and outlet openings and a diaphragm in a chamber communicating with the outlet opening tending to close the valve element together with a spring opposing the same. A manually movable valve stem engages the movable valve element and a static pressure control collar is adjustably positioned on the valve stem so that the valve may be preset to a desired static pressure, the arrangement being such that the diaphragm fluctuates responsive to pressure changes in flowing pressure at the outlet opening to maintain the same equal to the static pressure at which the valve was preset.

DESCRIPTION OF THE PREFERRED EMBODIMENT

Figure 1:
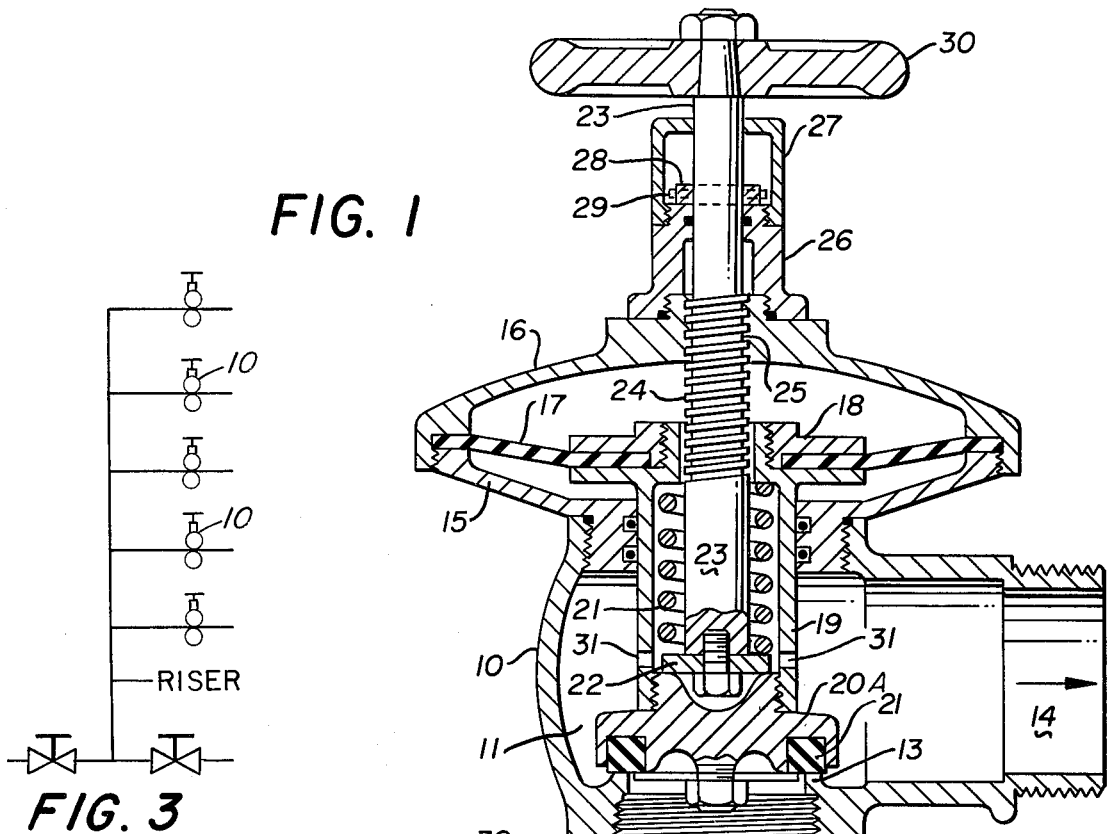
FIG. 1 is a vertical section through the pressure control valve.
Figure 3:
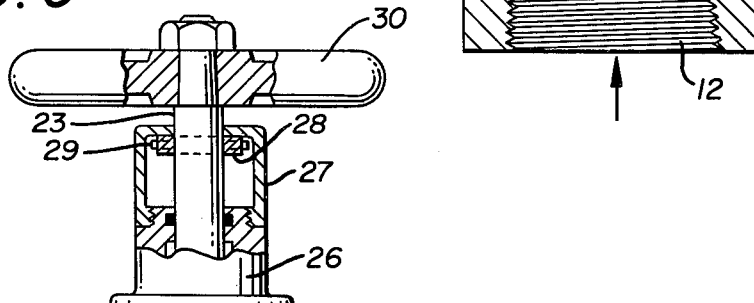
FIG. 3 is a diagrammatical view showing a vertically arranged series of pressure control valves.

In the form of the invention chosen for illustration and description herein, the pressure control valve consists of a body 10 having a chamber 11 therein and an inlet opening 12 communicating therewith by way of a valve seat 13. An outlet opening 14 is also provided and the upper portion of the body 10 receives a two part diaphragm housing formed of lower and upper portions 15 and 16 respectively. A diaphragm 17 is positioned across the diaphragm housing formed by the portions 15 and 16 and the diaphragm 17 is centrally apertured and secured in a fitting 18 from which a cylindrical sleeve 19 depends. A valve element 20 is positioned on the lower end of the cylindrical sleeve 19 and is therefor movable vertically responsive to changes in position of the diaphragm 17. An annular gasket 20A is positioned in the lower surface of the valve element 20 for registry with the valve seat 13 and it will thus be seen that the valve element 20 controls fluid entering the pressure control valve body 10 by way of the inlet opening 12.

Still referring to FIG. 1 of the drawings, it will be seen that the cylindrical sleeve 19 is slidably sealed with respect to a central opening in the lower portion 15 of the diaphragm housing and that the interior of the cylindrical sleeve 19 defines an area in which a coil spring 21 is positioned with its upper end engaged against the fitting 18 and its lower end engaged on an annular member 22 which is fastened to the lower end of a valve stem 23, the middle portion of which is provided with a thread pattern 24 threadably engaging a similar pattern 25 in the center of the upper portion 16 of the diaphragm housing. A bonnet 26 is positioned on the upper portion 16 of the diaphragm housing and around an upwardly continuing portion of the valve stem 23 and a cap 27 is removably engaged on the bonnet 26 as hereinafter described.

A static pressure control collar 28 having a plurality of set screws 29 is positioned within the cap 27 on the valve stem 23 and is movable relative thereto when the set screws 29 are loosened. A hand wheel 30 is secured to the uppermost end of the valve stem 23 so that the same can be rotated thereby so as to move the valve element 20 toward the valve seat 13 independently of similar motion imparted thereto by fluid pressure in the diaphragm housing engaging the upper surface of the diaphragm 17 therein.

Fluid pressure is admitted to the diaphragm housing and that portion thereof beneath the upper portion 16 thereof by openings 31 in the cylindrical sleeve 19 which establish communication between the chamber 11 in the valve body 10 and the interior of the cylindrical sleeve 19. The fluid pressure communicates between the interior of the cylindrical sleeve 19 and the upper portion of the diaphragm housing by way of the enlarged central opening in the fitting 18 through which the valve stem 23 passes. Thus fluid pressure in the chamber 11 which is the same as that in the outlet opening 14 of the pressure control valve is present on the upper side of the diaphragm 17 in the diaphragm housing of the valve.

By referring now to FIG. 2 of the drawings it will be seen that the exterior configuration of the pressure control valve heretofore described in connection with FIG. 1 has been illustrated and that the upper portion of the bonnet 26 has been broken away together with the cap 27 to show an adjusted positioning of the static pressure control collar 28. In operation a plurality of the pressure control valves disclosed herein are affixed to vertical water supply pipes in a multiple storage building, for example one on each of the floors of the building, so that fire hoses may be connected thereto and supplied with suitable working pressure therefrom. Normally such vertical water supply pipes are empty and have inlets at street level for connection to a water supply through the pumping equipment carried on fire trucks in case a normal high pressure water supply is not available. In order that there be adequate pressure at the roof of the building, the pressure at ground level may be excessive. For example, a 60 story building may require a ground level pressure in excess of 300 lbs. per square inch in order to maintain a suitable working pressure of 90 lbs. per square inch at roof level. Fire hoses however are usually designed for operation at working pressures of approximately 90 lbs. per square inch so that the hose will not rupture or be too stiff to handle. It will therefore be obvious to those skilled in the art that it is necessary to equip the vertical water supply pipes in a multiple story building with pressure control valves such as disclosed herein and in order that the pressure control valves at the various levels of the building will provide a desired static pressure and a like flowing discharge pressure, a valve such as that disclosed herein is highly desirable.

Figure 2:
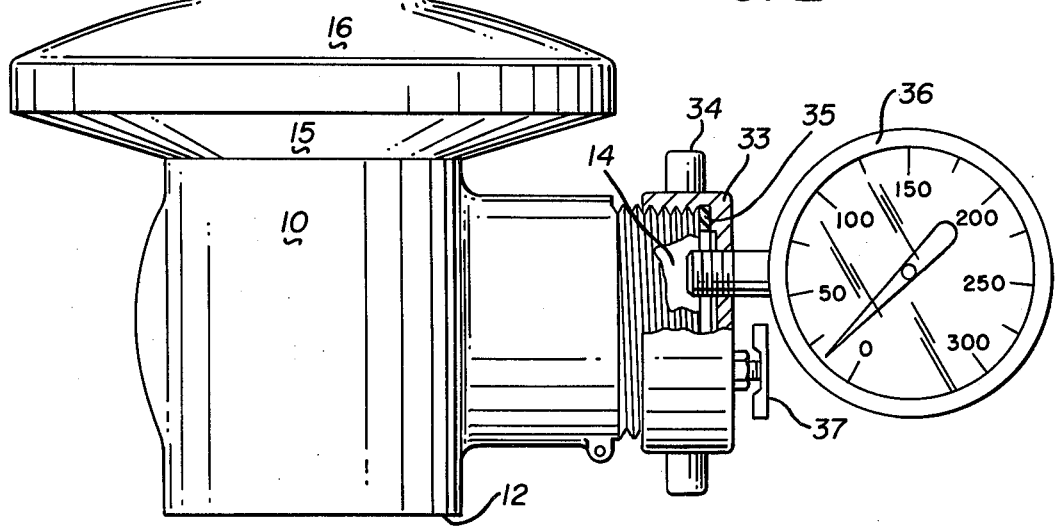
FIG. 2 is a side elevation of the pressure control valve with parts broken away and parts in cross section and illustrating a cap and pressure gauge used in presetting the valve.

In order to adjust the several valves in such a building it is necessary that each of the valves on each of the levels be preset to the particular water pressure to which the valves will be subjected in use, and by referring to FIG. 2 of the drawings it will be seen that in order to do so the pressure control valve of the present invention is attached to a suitable water pressure supply at its inlet opening 12. The discharge opening 14 is provided with a temporary cap 33 having radially extending lugs 34 and a sealing gasket 35 and to which cap 33 a pressure gauge 36 is attached so as to be in communication with the interior of the cap 33 and the chamber 11 in the valve body 10. A petcock 37 is also mounted on the cap 33 for communication with the interior thereof and the valve element 20 is closed by manual operation of the hand wheel 30. In presetting the valve the hand wheel 30 is revolved to open the valve and thereby allow the chamber 11 to fill with water with the petcock 37 open to provide for the venting of air therefrom. When such air is vented the petcock 37 is closed and the hand wheel 30 is revolved to further open the valve until the gauge 36 indicates the desired outlet pressure. The hand wheel 30 is then removed from the stem 23, the cap 27 is also removed to expose the static pressure control collar 28 and the set screws 29 therein are loosened so that the static pressure control collar 28 can be moved upwardly on the valve stem 23 until it is ⅞th of an inch above the top of the bonnet 26 as illustrated in FIG. 2 of the drawings. The set screws 29 are tightened to secure the collar 28 in such position and the cap 27 and the hand wheel 30 are replaced. The collar 28 will then be positioned against the top of the cap 27 and the valve cannot be opened further but it can be closed by rotating the valve stem 23 to move it downwardly. The valve is thus permanently set at the static discharge pressure selected for the position on the vertical water supply pipe in which it is to be installed. The cap 33 is removed after setting.

Those skilled in the art will observe that when the valve is in communication with a vertical water supply pipe such as hereinbefore described and water pressure is present in the pipe, the valve is opened by turning the hand wheel 30 counter clockwise until the static pressure control collar 28 is stopped by contact with the top of the cap 27. Assuming a fire hose with a shut off nozzle thereon in closed position is attached to the discharge opening 14 of the valve the pressure will build in the hose and the valve to the preset static pressure. When the discharge nozzle is opened allowing the water to flow through the hose, the volume of water being discharged will cause a drop in pressure in the diaphragm housing above the diaphragm 17 which permits the supply pressure plus the urging of the spring 21 to further open the valve element 20 with respect to the valve seat 13. As more water enters the pressure again rises in the valve and in the diaphragm housing above the diaphragm 17 causing the same to move downwardly and maintain the required positioning of the valve element 20 with respect to the valve seat 13 to provide a flowing pressure equal to the static pressure at which the valve was preset. When the nozzle on the fire hose is shut off the action reverses and the extra pressure in the valve causes increased pressure on the upper surface of the diaphragm 17 thus closing the valve and preventing a built up in the valve and hose which is undesirable.

It will thus be seen that a pressure control valve has been disclosed which can be quickly and easily adjusted to a desired set static pressure and that the valve will thereafter automatically adjust to a similar flowing discharge pressure.

Although but one embodiment of the present invention has been illustrated and described, it will be apparent to those skilled in the art that various changes and modifications may be made therein without departing from the spirit of the invention.

I claim:

1. A pressure-regulating valve for connection to a riser for use in multistory buildings to fight fire, wherein a valve is connected to the riser at each floor of the building and each valve is preset to obtain a desired flow therefrom at the respective floor, comprising: a valve body having an inlet and an outlet, the axes of the inlet and outlet disposed substantially at right angles to one another; a valve seat in the valve body between the inlet and outlet, the plane of the valve seat disposed transverse to the axis of the inlet; said valve body having an opening therethrough in alignment with the inlet and opposite thereto; a pressure chamber secured to the body in registry with the opening; a diaphragm extending transversely across the chamber and secured at its periphery in the chamber; a hollow, elongate sleeve secured at one end to the diaphragm and extending therefrom through the opening and into proximity at its other end with the valve seat; a valve closure member carried by the other end of the sleeve for opening and closing relationship with the seat; seal means slidably sealing said sleeve in said opening; a valve stem extended through the chamber and coaxially into the sleeve; said one end of said sleeve being open and said stem extended through said open end and threadably extended through an opening in a wall of the chamber; an annular spring abutment secured on one end of the stem inside said sleeve; a coil spring disposed around said stem and engaged at one end against said abutment and at its other end against said sleeve, urging said diaphragm, and thus said closure member, away from the valve seat; a bonnet secured on said chamber exteriorly thereof in sealing relationship with said stem; a cap removably secured on said bonnet, with said stem extended axially therethrough; a normally inaccessible pressure control adjusting collar adjustably secured on said stem between the bonnet and cap and engagable with said cap upon movement of the stem in a valve opening direction to limit opening movement of the valve and thus determine the maximum flow through the valve; a hand wheel secured to the stem exteriorly of the cap for manipulating the valve between open and closed positions; and fluid passage means extending through the sleeve to the pressure chamber on the side of the diaphragm opposite the valve closure member and in communication with the valve outlet, whereby when the valve is open, fluid pressure on the outlet side of the valve is communicated to the pressure chamber and tends to close the valve in opposition to the spring force acting on the diaphragm.

2. A valve as in claim 1, wherein set screws are extended through the collar into engagement with the stem releasably securing the collar in position.

3. A valve as in claim 2, wherein the fluid passage means extends through a side of the sleeve in open communication at all times with the outlet.

* * * * *